United States Patent
Lemke et al.

(12) 
(10) Patent No.: US 6,247,547 B1
(45) Date of Patent: *Jun. 19, 2001

(54) SUSPENSION AND DRIVE MECHANISM FOR A MULTI-SURFACE VEHICLE

(75) Inventors: Gary Lemke; Brad Lemke; Cary Safe; Edgar Hetteen, all of Grand Rapids, MN (US)

(73) Assignee: A.S.V., Inc., Grand Rapids, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,685

(22) Filed: Apr. 21, 1998

(51) Int. Cl.[7] .................................................. B62D 55/10
(52) U.S. Cl. ......................... 180/9.5; 305/132; 305/178; 305/193; 305/199
(58) Field of Search .................................. 180/9.1, 9.58, 180/9.5; 280/124.169; 305/107, 110, 115, 120, 121, 124, 129, 130, 131, 132, 133, 134, 135, 136, 137, 142, 178, 179, 192, 195, 193, 199

(56) References Cited

U.S. PATENT DOCUMENTS

| | | | |
|---|---|---|---|
| 1,140,969 | * | 5/1915 | Eastman . |
| 3,575,474 | * | 4/1971 | Russ, Sr. ............................... 305/165 |
| 3,601,424 | * | 8/1971 | Badland ............................... 280/717 |
| 3,747,995 | * | 7/1973 | Russ, Sr. ............................... 305/179 |
| 3,774,708 | * | 11/1973 | Purcell et al. ......................... 180/9.5 |
| 3,828,873 | * | 8/1974 | Oestmann ............................. 180/9.5 |
| 3,883,191 | | 5/1975 | Chaumont ............................. 305/35 |
| 3,934,944 | * | 1/1976 | Forsgen ............................... 180/9.58 |
| 4,152,031 | | 5/1979 | Maguire ............................... 305/14 |

(List continued on next page.)

FOREIGN PATENT DOCUMENTS

93/11022    12/1992    (WO) ............................ B62D/55/24

OTHER PUBLICATIONS

ASV, "POSI–TRACK Model MD 70, Model MD 70 Turbo, Operator and Service Manual", All Season Vehicles, Inc., P.O. Box 5160, 840 Lily Lane, Grand Parids, MN 55744, ASV: Part #0400–819, 1–41, (Oct. 1993).

(List continued on next page.)

Primary Examiner—Kevin Hurley
(74) Attorney, Agent, or Firm—Schwegman, Lundberg, Woessner & Kluth, P.A.

(57) ABSTRACT

A tracked vehicle produces a pressure no more than 3 psi on the ground by increasing the number of contact points on the inner surface of the track. The stiffness of the track is also selected to minimize bowing between the idler wheels or rollers. The track is therefore kept substantially straight between the rollers so increase the efficiency associated with transferring power to track. The drive sprocket is positioned above the ground so as to eliminate complexity in the design and yet effectively transmit power to the tracks. Positioning the drive sprocket above ground also prevents derailing of the track. The track is also held in a constant state of tension on the driver sprocket and the roller. This too prevents derailment. The undercarriage of the vehicle includes torsion axles and sealed bearings to provide for a lower maintenance track. Components associated with the undercarriage do not require constant greasing and cleaning of the idler wheels. The track is beveled so that it does not rip up surfaces. The drive sprocket is provided with roller sleeves that accommodate the changes in the pitch line of an elastomeric flat track. The sprocket does not "scrub" the areas between the driving lugs. The drive sprocket includes a pair of scrapers and a pair of conical shields which provide self cleaning and which remove debris from the sprocket area.

29 Claims, 10 Drawing Sheets

U.S. PATENT DOCUMENTS

| | | | |
|---|---|---|---|
| 4,198,103 | * | 4/1980 | Ward et al. ............................ 305/165 |
| 4,279,449 | * | 7/1981 | Martin et al. ......................... 305/178 |
| 4,616,724 | | 10/1986 | Lemke ................................ 180/6.48 |
| 4,830,439 | | 5/1989 | Collins et al. .......................... 305/11 |
| 4,961,395 | * | 10/1990 | Coast .................................... 114/270 |
| 5,352,029 | | 10/1994 | Nagorcka ................................ 305/39 |
| 5,484,321 | * | 1/1996 | Ishimoto ................................ 305/57 |
| 5,494,125 | | 2/1996 | Gustin et al. .......................... 180/9.1 |
| 5,527,046 | | 6/1996 | Bedford ................................. 277/92 |
| 5,607,210 | | 3/1997 | Brazier ................................. 305/131 |
| 5,775,447 | * | 7/1998 | Dester et al. .......................... 180/9.1 |
| 5,842,757 | | 12/1998 | Kelderman ........................... 305/125 |
| 5,899,541 | * | 5/1999 | Ying et al. ........................... 305/115 |
| 5,938,301 | * | 8/1999 | Hostetler et al. .................... 305/199 |
| 5,988,775 | * | 11/1999 | Nordberg ............................. 305/143 |

OTHER PUBLICATIONS

ASV, "POSI–TRACK Model MD 70, Model MD 70 Turbo, Parts Manual", All Season Vehicles, Inc. P.O. Box 5160, 840 Lily Lane, Grand Rapids, MN 55744, ASV, Part #0401–172, 39, and A1–A27, (Oct. 1993).

* cited by examiner

SUSPENSION AND DRIVE MECHANISM FOR A MULTI-SURFACE VEHICLE

FIELD OF THE INVENTION

The invention relates to a multi-surface vehicle, and more particularly to the suspension and drive mechanism associated with a multi-surface vehicle with a rubber track.

BACKGROUND OF THE INVENTION

A variety of track driven vehicles have been around for many years. Tracked vehicles vary from 100 ton military tanks and bull-dozers to 300 pound snowmobiles. Track types vary from segmented steel tracks to one piece molded rubber tracks.

One of the major design challenges with all types of tracks and vehicles is to find the most efficient way to transfer the torque of the drive mechanism to the track with minimum power loss. There are many torque transmission systems. The three most common torque transmission systems are an external drive, a friction drive and an internal drive. External drives include a sprocket with a fixed number of teeth around the circumference that drives against a rigid member attached to the track. The sprocket teeth protrude through the track to a point where the rigid members can not slip back under a heavy load. Friction drives include a wheel attached to the drive axle and drive against the inside surface of a track. The outside of the wheel and the inside of the track are typically made of resilient material such as rubber or other composites. The track tension must be extremely tight to prevent slippage. The track tension also results in power loss. Internal drive systems, also known as involute drives, have a track with drive lugs attached to the inside surface of the track. The drive lugs may be molded to the inside surface of a rubber track. The drive sprocket is made by attaching rigid drive teeth to a rigid radius wheel. The sprocket teeth drive against the internal drive lugs on the track.

Internal drive systems are generally considered the most efficient drive for tracks made of elastomeric material such as rubber when the drive lugs and drive sprockets are properly matched. They are properly matched when the pitch diameter of the sprocket matches the pitch line of the track. Another way of determining whether they are properly matched is when the pitch diameter of the sprocket causes the drive teeth to match perfectly with the center to center distance between the track drive lugs. In practice, proper matching is difficult to achieve especially when using an elastomeric or rubber track. Tracks made of elastomeric materials are resilient. As a result, the elastomeric material stretches or contracts slightly depending on a number of factors. One of the more common factors that causes changes in the pitch length is the variation in the load applied to a track during operation of the multi-surface vehicle. The load on the track and on the internal lugs will be higher when the vehicle is pulling a log as compared to the load on the track applied to merely move the vehicle over terrain. The tracks may be loaded differently when turning. An outside track will typically be loaded to a higher degree when compared to an inside track. The pitch length of the track varies with the variations in the load applied to the track.

Variations in the pitch length of the track results in a mismatch between the pitch length of the track and the pitch diameter of the sprocket. When using a sprocket having rigid drive teeth, the change in the pitch length along the track causes the sprocket teeth to "scrub in" or "scrub out" or both. In other words, the rigid tooth is rubbing between the individual drive lugs on the internal surface of the flat belt. This causes a loss in efficiency. Scrubbing in or out can result in extreme power loss and excessive wear on the track drive lugs and sprocket teeth.

Another common problem with flat tracks such as those made from an elastomeric material is that foreign matter or sticky material builds up in the sprocket area. Metal tracks usually have openings through which at least some foreign matter may be passed. The buildup is worse on a flat track. When foreign matter builds up in the sprocket area the pitch diameter or the pitch line of the flat track is likely to change. This results in power loss and excessive wear. Rocks, sticks, grass, mud, snow and other materials may build up in the sprocket area.

Military tanks and bull-dozers are two common vehicles featuring metal tracks. Metal tracks are typically mounted on drive wheels and idler wheels that are mounted on springs or suspension systems that allow the drive wheel to move slightly from a fixed position. The use of rollers on the track drive segments of a metal track reduces noise and reduces wear between the individual segments of the metal track. The springs or suspension associated with the idler wheels allows the metal track to accommodate obstacles encountered by the metal track. At the drive wheels, the springs also accommodate slight variations in pitch diameter.

Metal tracked vehicles have many problems. One of the problems is that metal tracked vehicles are very heavy and tend to sink in and damage relatively soft surfaces. The pressure produced by a metal tracked vehicle is relatively high. For example, when a metal tracked vehicle operates in mud, the vehicle typically sinks to solid ground rather than passing over such a surface. The tracks also are tough on surfaces such as grass or lawns. The pressure produced by the metal track of a bull-dozer or a tank typically produces indentations in a surface. For example, if a bull-dozer passes over a residential lawn, the pressure is high enough to compact the earth and form a permanent indentation. A home owner would have to fill in the impressions with additional soil to fix the lawn. In addition, the metal tracks typically have square edges which dig into surfaces during turns. A turning bull-dozer dozer would rec havoc with residential lawns. Metal tracks can also become derailed.

Some tracked vehicles have used rubber tracks. Typically, designers of metal tracked vehicles carry over many of the design characteristics into flat track vehicles using elastomeric or rubber tracks. Many of the problems encountered with metal tracks are also encountered with rubber tracks. For example, many rubber track designs include a track mounted on drive wheels or sprockets which are spring mounted. The problem of matching the pitch line of the track to the pitch diameter of the sprocket is further exacerbated. The drive wheels do not maintain the track near a constant state of tension so the pitch line can fluctuate widely.

In addition, the drive sprocket is positioned so that it in contact with the surface. Typically, the drive sprocket will be at the rear of the vehicle and positioned so that the track passes between the drive wheel and the ground. In such designs, the rear drive wheel has two jobs. The rear drive wheel drives the track and maintains the alignment of the track. When the rear drive wheel is on the ground, the two jobs the rear drive wheel is called on to do work against one another. When driven, the track tends to want to leave the drive wheel or "jump off the sprocket". It is necessary to maintain alignment to prevent derailing. Rear drive wheels on the ground are more prone to derailing since the forces associated with doing the two jobs counteract one another.

Another problem with rear drive wheels on the ground is that they tend to require additional complexity. Elongated gear boxes must be used to transfer power to these rear on the ground drive wheels.

Another problem associated with flat elastomeric tracked vehicles is that there are few idler wheels that contact the ground. The track tends to bow between the idler wheels which results in a loss of traction. In addition, with fewer points on the ground and bowing between the wheels, the effective surface pressure at various points under the wheels is high. The tracked vehicle does not have an even pressure across the flat track. Still another problem is that these vehicles are high maintenance. Each individual wheel must be greased periodically. In addition, since the environment for use includes foreign matter such as dirt, the individual idler wheels tend to wear. Because of the high maintenance and cost, there is a tendency to use lesser numbers of wheels in various designs.

As a result of high pressure per wheel, most designs of tracked vehicles using elastomeric or steel tracks are not environmentally friendly. Current designs still indent soft surfaces and tear up grass lands. In addition, the current vehicles are high maintenance. High maintenance is needed to assure that the components of the undercarriage do not prematurely wear.

Thus, there is a need for a for a tracked vehicle that produces a low pressure on the surface and which is environmentally friendly. In addition, there is a need for a lower maintenance vehicle not prone to derailing the track. In addition, there is a need for a vehicle which has many contact points, and therefore has lower pressure per wheel, on the track as it passes over the surface. There is also a need for a vehicle which does not require constant greasing and cleaning of the wheels in contact with the track. There is also a need for a vehicle which places the drive sprocket off the ground so as to eliminate complexity in the design and yet effectively transmit power to the tracks. In addition, there is a need for a sprocket which will accommodate the changes in the pitch line of an elastomeric flat track. In addition, there is a need for a sprocket which will not "scrub" between the driving lugs. There is also a need for a sprocket which is self cleaning and which removes debris from the sprocket area to minimize problems associated with debris build up changing the pitch relationship between the sprocket and the flat track.

SUMMARY OF THE INVENTION

A tracked vehicle produces a pressure no more than 3 psi on the ground and less than 190 pounds per contact point on the inner surface of the track. Multiple wheels across the width of the track eliminate bowing between the idler wheels or rollers. The track is therefore kept substantially straight across the rollers to increase the efficiency associated with transferring power to track. The drive sprocket is positioned above the ground so as to eliminate complexity in the design and yet effectively transmit power to the tracks. Positioning the drive sprocket above ground also prevents derailing of the track. The track is also held in a constant state of tension on the driver sprocket and the roller. This too prevents derailment. The undercarriage of the vehicle includes torsion axles and sealed bearings to provide for a lower maintenance track. Components associated with the undercarriage do not require constant greasing and cleaning of the idler wheels. The track is beveled so that it does not rip up surfaces. The drive sprocket is provided with roller sleeves that accommodate the changes in the pitch line of an elastomeric flat track. The sprocket does not "scrub" the areas between the driving lugs. The drive sprocket includes a pair of scrapers which provide self cleaning and which remove debris from the sprocket area.

Advantageously, the vehicle will travel over soft surfaces without causing damage to the surface. In addition, unlike other vehicles, the vehicle sinks little in soft mud or snow. The resulting vehicle is very effective in transmitting power to the surface over which it passes. The vehicle requires very low maintenance since the bearings associated with the undercarriage are sealed. Other suspension units are simple and straightforward and require little or no maintenance. The vehicle also is less prone to track derailment.

BRIEF DESCRIPTION OF THE DRAWINGS

The following detailed description of the preferred embodiments can best be understood when read in conjunction with the following drawings, in which.

DETAILED DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
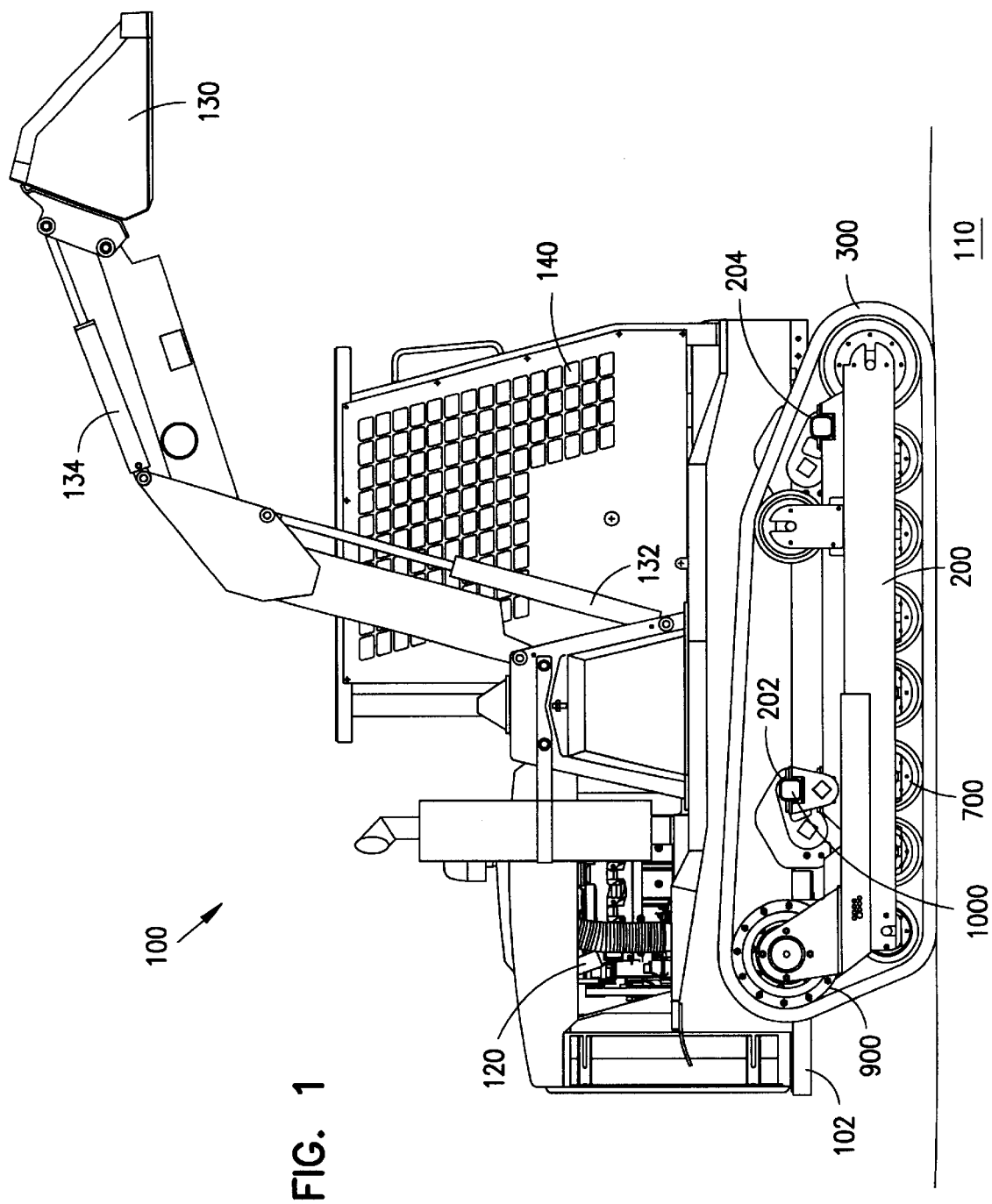
FIG. 1 is a side view of the multi-surface vehicle.

FIG. 1 shows a perspective view of a multi-surface vehicle 100 on a surface 110. The multi-surface vehicle 100 includes a frame 102 which carries an engine 120 such as an eighty horsepower, 4.5 liter John Deere PowerTech Diesel or a one hundred fifteen horsepower, 4.5 liter John Deere PowerTech Turbo Diesel. Both of these engines are available from John Deere and Company of Moline, Ill. The engine 120 powers a hydrostatic transmission which powers hydraulic drive motors with planetary gear boxes which eliminates additional chains and sprockets, thereby lessening the complexity and increasing the efficiency of the drive system. Two auxiliary pumps are used to power different accessories. As shown, the vehicle includes a loader/bucket accessory 130. The engine 120 powers hydraulic pumps used to drive the hydraulic cylinders 132 and 134 for operation of the loader 130. Other accessories, such as a blade or logging device may be substituted for the loader 130. The vehicle 100 also includes an operator cab 140. The operator cab is equipped with controls for controlling the loader 130 and for operating the multi-surface vehicle 100. Attached to the frame 102 of the multi-surface vehicle 100 is an undercarriage 200. A duplicate undercarriage is attached to the other side of the frame 102. The undercarriage 200 is attached to the frame 102 via torsion axle type suspension units 1000. The undercarriage 200 includes a drive sprocket 900 for driving a flat elastomeric or rubber track 300. It should be noted that the drive sprocket 900 is positioned off the surface 110 so that it will stay clean for a longer life. The undercarriage 200 features multiple idler wheels 700 on axles (shown in FIG. 2) which engage the inner portion of the track 300 as the track engages the surface 110. The wheels 700 are of a selected diameter and spaced so that track 300 will not bow between the contact points as the track travels over the surface 110. The properties of the elastomeric track 300 also are selected so that the track has a sufficient stiffness so that the track 300 stays substantially straight between the contact points of the various idler wheels 700. As shown in FIG. 1, eight different axles carrying wheels 700 are shown in contact with the track 300. The wheels 700 provide multiple contact points which more evenly distribute the weight of the vehicle 100 and its load over the two tracks 300. By keeping the individual tracks 300 substantially straight between the various contact points, the track 300 is also better able to grip the surface 110.

Figure 2:
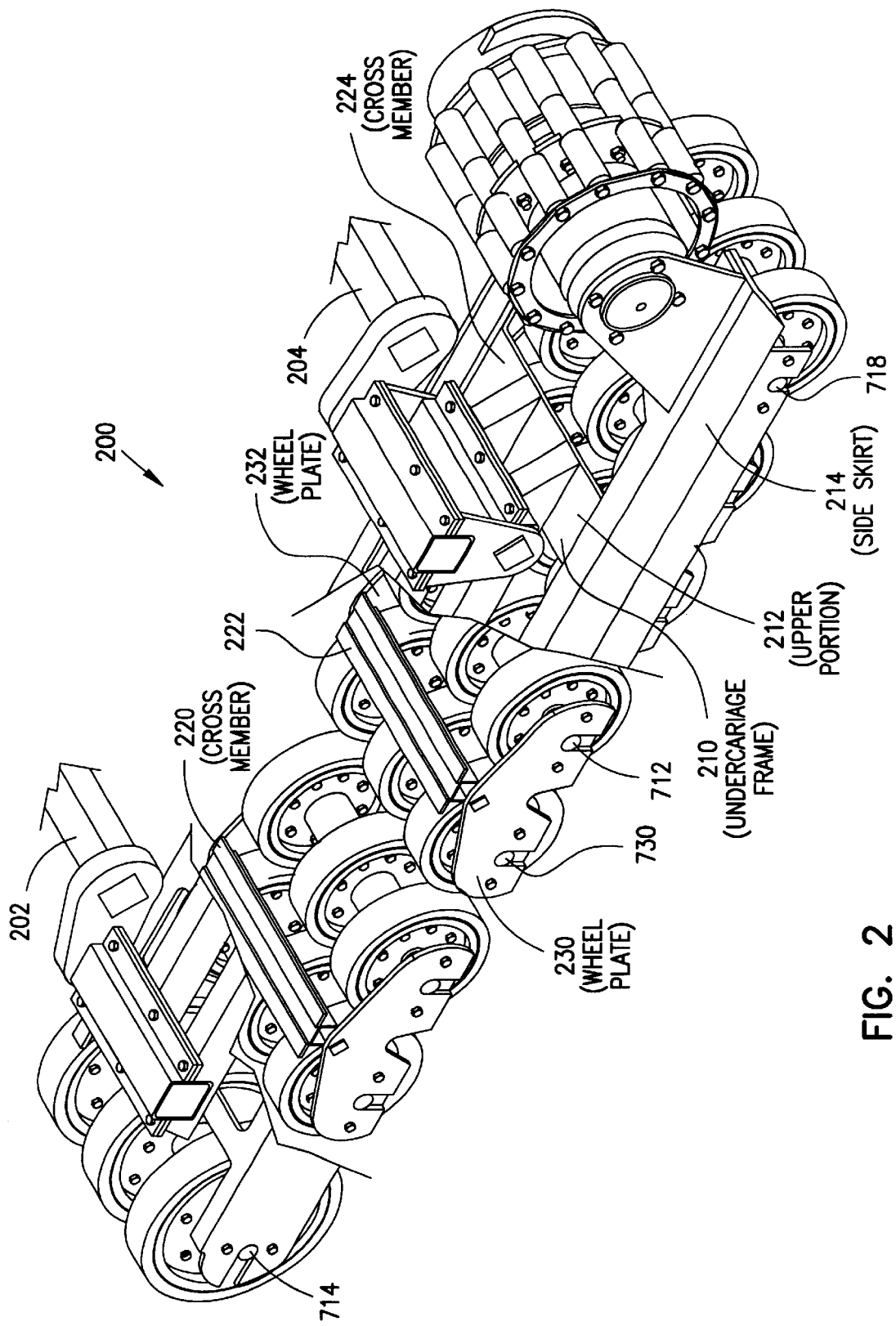
FIG. 2 is perspective view of the undercarriage of the multi-surface vehicle.
Figure 9:
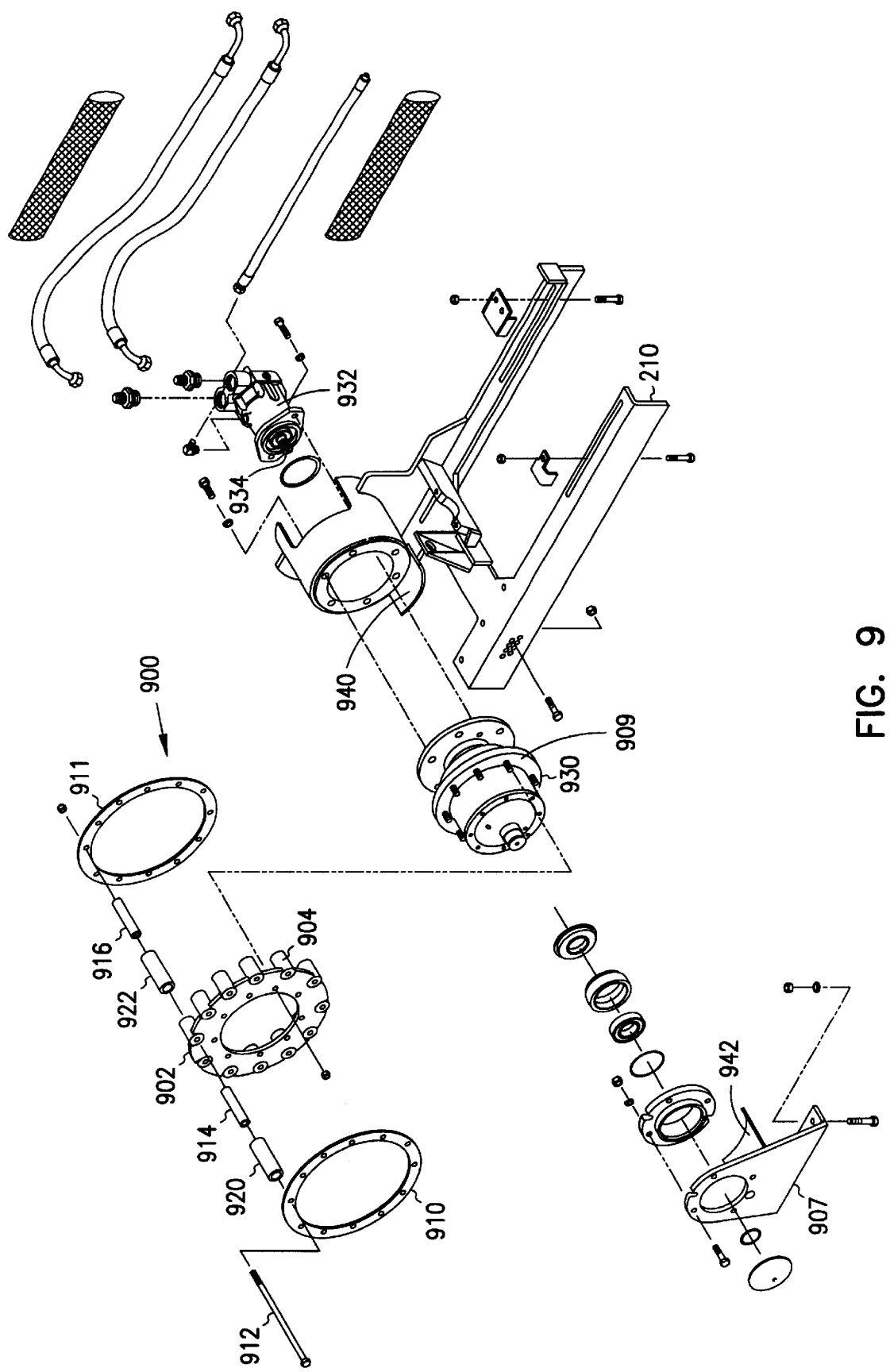
FIG. 9 is a perspective view of the drive sprocket which engages the drive lugs on the track and a scraper.

FIG. 2 is perspective view of one side of the undercarriage 200 of the multi-surface vehicle 100. The As can be seen from this view, there are two frame members 202 and 204 which are part of the frame 102 of the vehicle 100. The undercarriage 200 includes an undercarriage frame 210 which includes an upper portion 212 and a side skirt 214. Attached to the upper portion 212 of the undercarriage frame 210 are cross members 220, 222, and 224. The cross members include a channel each of which accommodates a suspension unit or torsion axle 1000. The torsion axle type suspension unit 1000, which will be described in more detail in FIG. 9, provides an essentially maintenance free suspension member which does not require greasing or regular cleaning. Attached to each end of a cross member is a wheel plate 230 and a wheel plate 232. The wheel plates for cross member 222 are described here. For the sake of clarity, the other wheel plates are not numbered. The other wheel plates are attached to cross members 220 and 224 are substantially identical to the wheel plates 230 and 232 attached to cross member 222. Each wheel plate carries two wheel axles 710 and 712. Each wheel axle carries three wheels 700. The wheels 700 have a rubber or plastic outer annulus 702 attached to a central wheel 704 made of either plastic or metal. The outer annulus provides for enhanced contact with the flat track or belt. The wheels 700 attached to first end axle 714 and to second end axle 718 are fixed with respect to the undercarriage frame 210. The end axles 714 and 718 are actually in a fixed position in a notch in the side skirt 214 of the undercarriage frame 210.

Also attached to the undercarriage frame 210 at a position above the end axle 718 is the drive sprocket 900. The drive sprocket 900 is in a fixed position with respect to the undercarriage frame 210. It should be noted that the wheels on the end axle 714, the wheels on the end axle 718, and the drive sprocket 900 are all in fixed position with respect to the undercarriage frame 210. These particular wheels and the drive sprocket 900 define the outer limits of the flat track 300. It is important to have a fixed position for these wheels and the drive sprocket 900 so that the elastomeric track 300 is held in a substantially constant state of tension. The pitch length of an elastomeric track, such as those made of rubber, will vary slightly. The pitch length will stretch slightly as variable loads are applied to the track 300. The use of springs or other suspension means at these points will allow for the track to collapse inward too much when a load is placed on the track 300. Springs or other suspension means, commonly used to keep metal tracks, will allow the elastomer tracks to dislodge or come off. Therefore, it is imperative that no springs or anything are used to maintain the tension on the track.

As can be seen, the wheels 700 provide for a plurality of contact points onto the internal surface of the track. In fact the eight axles each having 3 wheels provide for a total of 24 contact points to the internal surface of the flat track 300. The vehicle has a duplicate undercarriage on the other side of the vehicle. The end result is at any given time there is approximately 2,844 square inches in contact with the ground or surface 110. Forty eight wheels or contact rollers spread the weight evenly over the two tracks 300 so that superior traction and flotation are achieved. There is also a minimal amount of force at each contact point. The ground pressure associated with the vehicle 100 is no more than 3 psi (pounds per square inch) which means that the vehicle has the capability to work on soft ground or lawns without forming ruts or compacting soil.

Of course to keep the soil from compacting or forming ruts, the elastomeric track 300 is formed of a material which is stiff enough such that it will not bow between the contact points of the wheels 700. This the track 300 substantially flat and in contact with the ground or surface 300.

Figure 3:
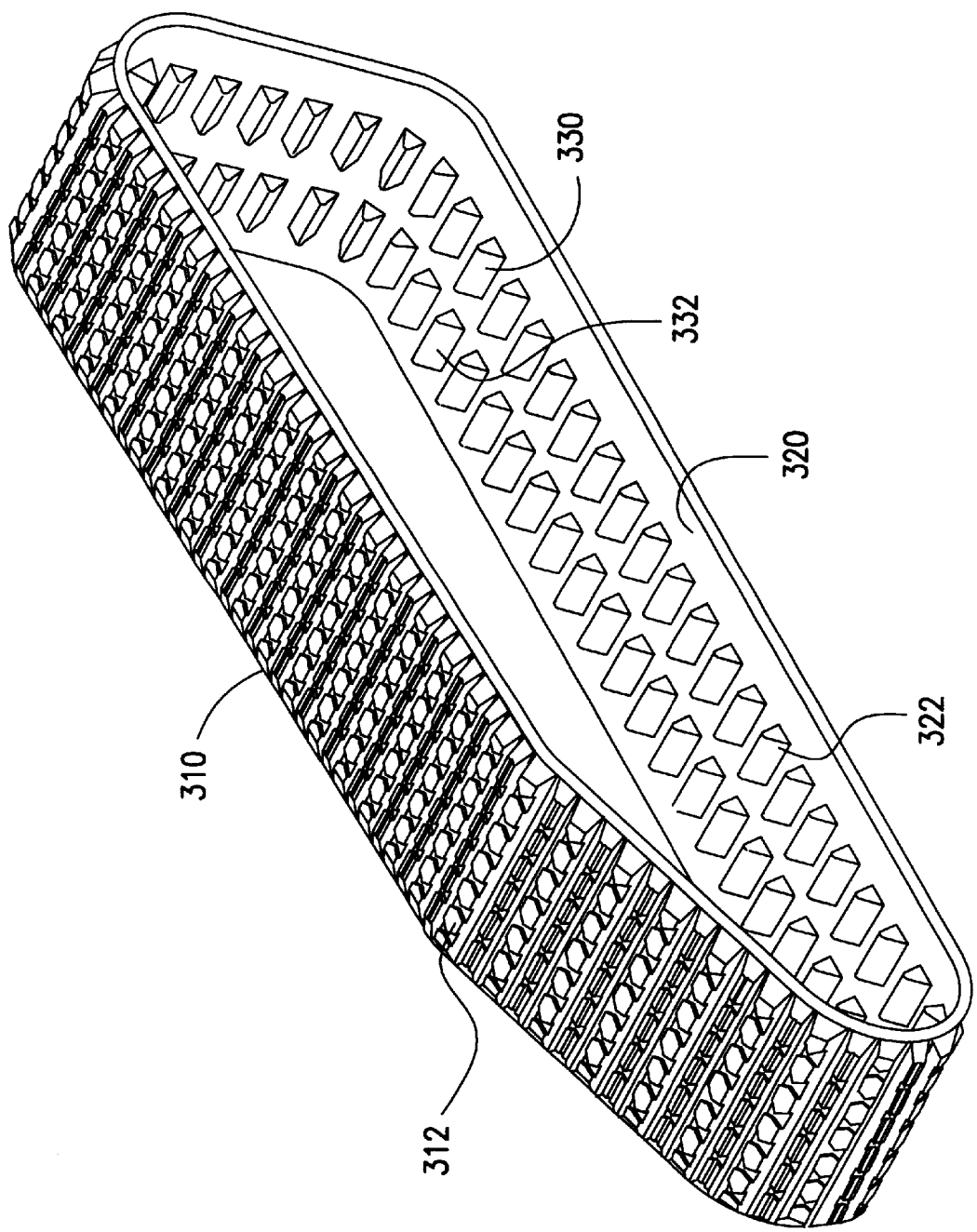
FIG. 3 is perspective view of the rubber track used with the multi-surface vehicle.

FIG. 3 is perspective view of the elastomeric or rubber track 300 used with the multi-surface vehicle 100. The track 300 has an outer surface 310 which has a tread pattern 312. The track 300 also has an inner surface 320. Attached or molded to the inner surface of the track 300 are a plurality of drive lugs 322. The drive lugs 322 are arranged in two rows 330 and 332. The spacing between the rows 330 and 332 is selected so that the width of the middle wheels on a three wheel axle fits between the first row 330 of drive lugs 322 and the second row 332 of drive lugs 322. Typically approximately one-half inch of clearance is provided so that the track 300 can shift an appropriate amount during a turn or other operation. The outer wheels 700 fit between one row of lugs 322 and the outer edge of the track 300. The spacing from one lug 322 to another within a row is selected so that the lugs 322 will properly engage the sprocket 900. Proper engagement would match the pitch diameter of the drive sprocket 900 to the pitch line of the track 300. Of course, this is difficult to achieve since there are different forces on the track 300 at various times.

Figure 4:
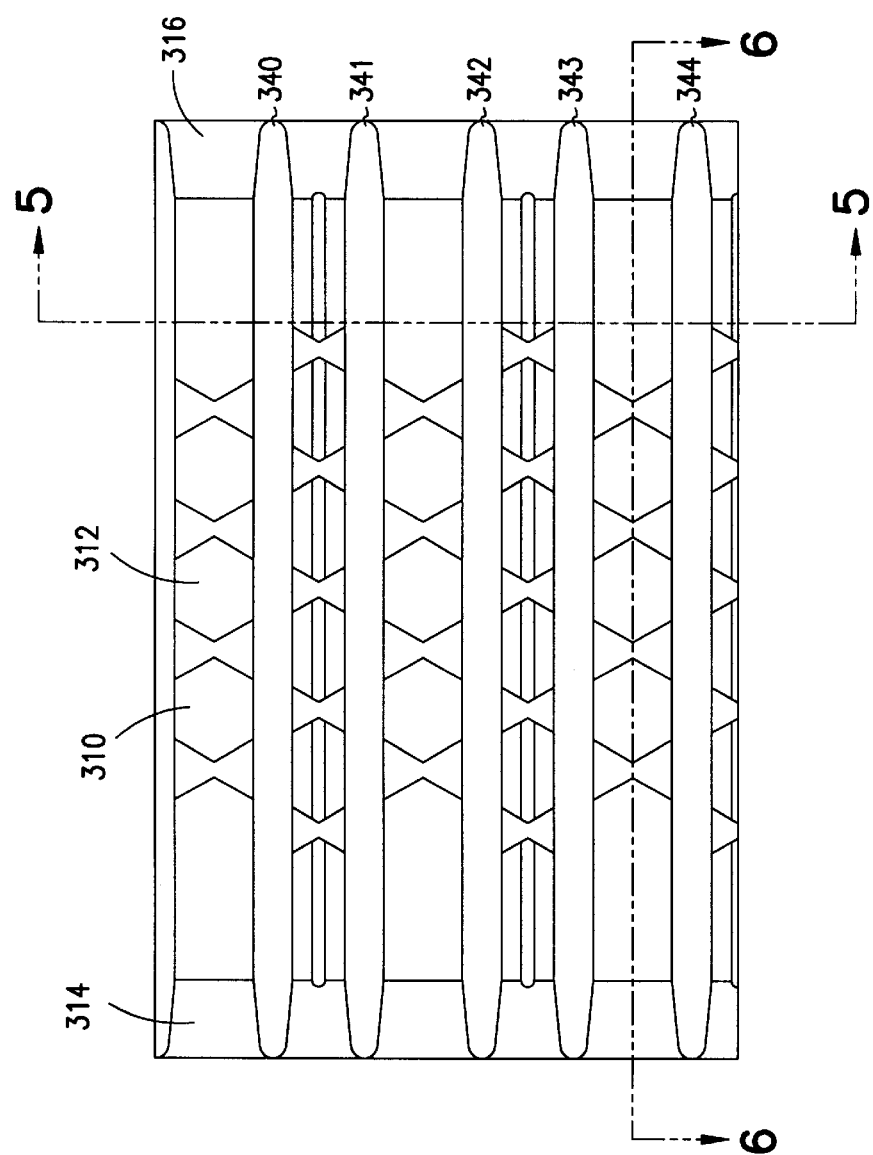
FIG. 4 is a top view of the track showing the tread pattern.

FIG. 4 is a top view of the outer surface 310 of a section of the track 300 showing the tread pattern 312. The tread pattern 312 includes a series of transverse grooves 340, 341, 342, 343, and 344. The tread pattern 312 also includes a first beveled edge 314 and a second beveled edge 316. The beveled edges 314 and 316 allow some side-to-side movement which accommodates turns made with the elastomeric or rubber track 300. The allowance of the side-to-side motion from turning makes for a very environmentally friendly track. Unlike square tracks that typically dig into the ground and produce track damage, the beveled edges 314 and 316 on the track 300 can slip over the ground during a turn to leave the terrain substantially undamaged. The transverse grooves 340, 341, 342, 343, and 344 are at a selected spacing and at a selected depth so as to leave ribs 370, 372, 374 and 376 between the grooves. The ribs 370, 372, 374 and 376 formed between the grooves 340, 341, 342, 343, and 344 are dimension so that after the track passes over the wheels 700 associated with the end axle 714 and into contact with the ground, the ribs 370, 372, 374, and 376 close and grip the vegetation or the ground surface 110 for added traction.

Figure 5:
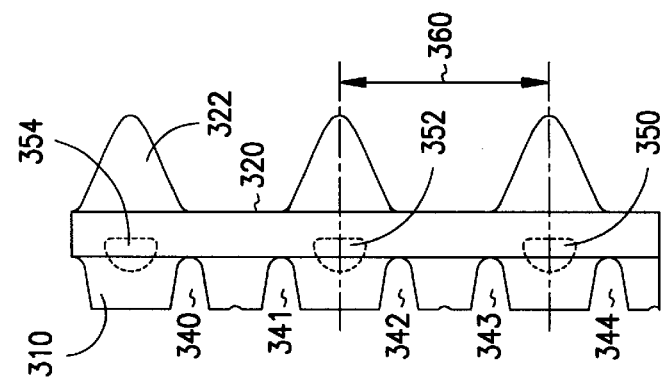
FIG. 5 is a cross-sectional view along line 5—5 in FIG. 4.

FIG. 5 is a cross-sectional view along line 5—5 in FIG. 4. Both the inner surface 320 and the outer surface 310 of the track are shown in this view. The track also includes stiffeners 350, 352, and 354. The stiffeners 350, 352 and 354 increase the stiffeners of the track 300 across the width of the track 300. The stiffeners 350, 352 and 354 are fiberglass rods which are molded into the track. The stiffeners 350, 352 and 354 are placed in the wider ribs 372 and 376 such as those formed between grooves 341 and 342, and formed between grooves 343 and 344. The driving lugs 322 are shown molded or attached to the inner surface 320 of the track 300. The distance between the lugs 322, depicted by the reference number 360 is selected so that the engaging portions of the drive sprocket 900 engages the portion of the inner surface 320 between adjacent lugs 322 in a row. Ideally, the "teeth" of the drive sprocket 322 would engage the lugs 322 with little or no backlash or extra spacing located between the lugs 322. This is difficult to achieve given that the pitch of the elastomeric track 300 will stretch slightly as a function of the load placed on the track 300.

Figure 6:
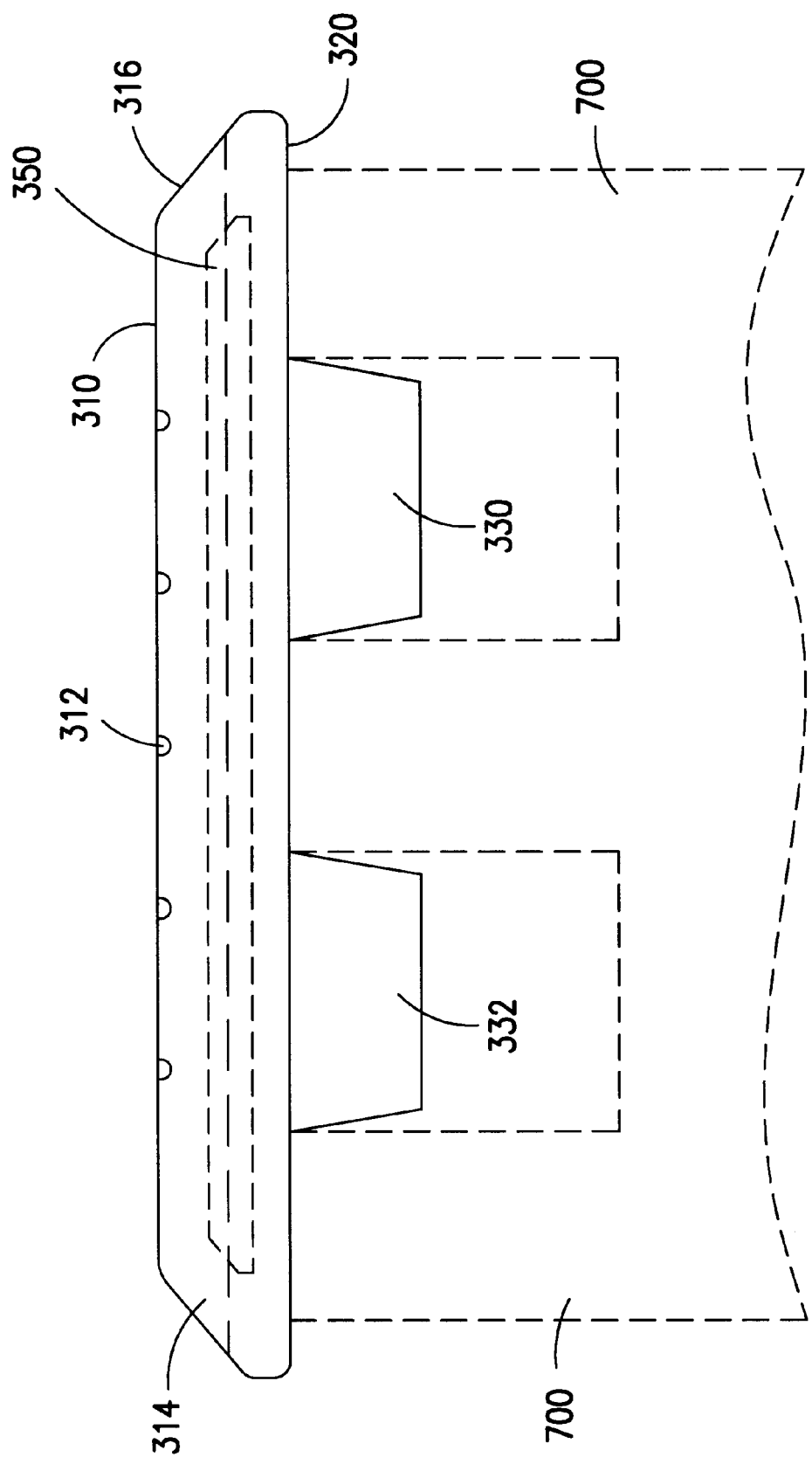
FIG. 6 is a cross-sectional view along line 6—6 in FIG. 4 showing the idler wheels in phantom engaging the lugs of the track.

FIG. 6 is a cross-sectional view along line 6—6 in FIG. 4. The rollers or idler wheels 700 engaging the lugs of the track have been added in phantom to FIG. 6. As can be seen, the rollers or idler wheels 700 do not fit tightly with respect to the rows 330 and 332 of lugs 322. This allows for slight movement of the track with respect to the wheels 700 attached to a single axle, such as axle 710 (shown in FIGS. 2 and 7). The rows 330 and 332 are spaced such that the wheels 700 of the undercarriage fit between the rows 330 and 332. The drive lugs 322 thus prevent the track from dislodging or jumping off since the engaging drive lugs control or stop the side-to-side motion of the track 300. The drive lugs 322 have beveled sides 323 and 324 which allow the beveled sides of the multiple wheels to butt up against the tracks. Another aspect of these driving lugs 322 is that the spacing on them allows the track some lateral movement. The lateral movement enhances the turnability of the vehicle 100.

One stiffener 350 is shown in FIG. 6. The stiffener 350 is molded into the track 300 and is a fiberglass rod positioned transverse to the path of travel. The transverse fiberglass rods strengthen the track. The fiberglass rod 350 terminates well short of the beveled edges 314 and 316 so as to prevent the stiffener 350 from releasing from the flat track 300. On other flat tracks, the release of a fiberglass rod from the track was a precursor to track failure. As a result, the fiberglass rod 350 is stopped well short of the end of track 300 and then enveloped in five to seven layers of Kevlar or another tire cording material. This prevents the stiffener 350 from leaving the flat track 300 thereby forming a weak spot in the track.

Figure 7:
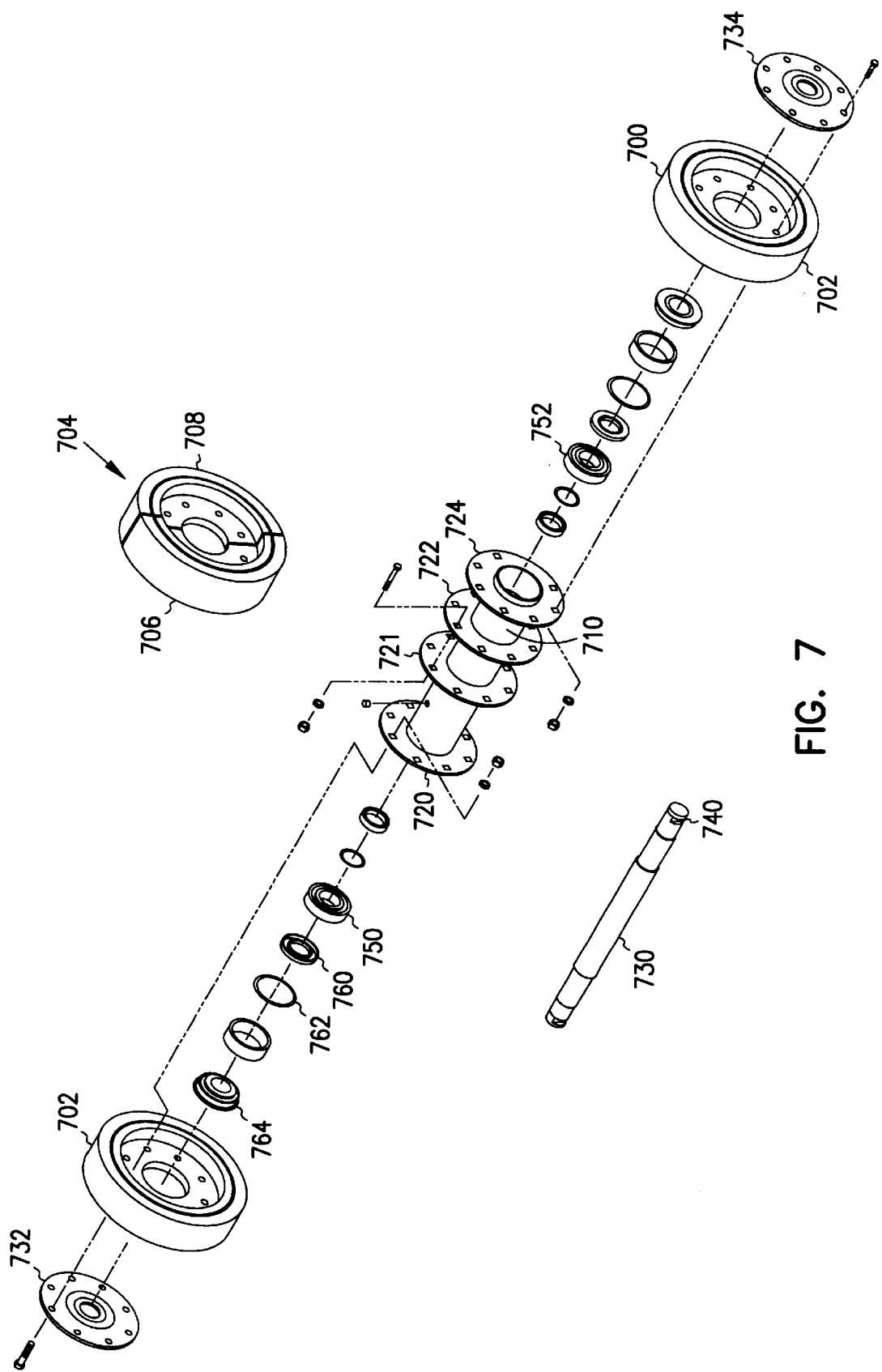
FIG. 7 is an exploded perspective view showing multiple wheels attached to a single tubular axle having multiple wheels and sealed bearings.
Figure 8:
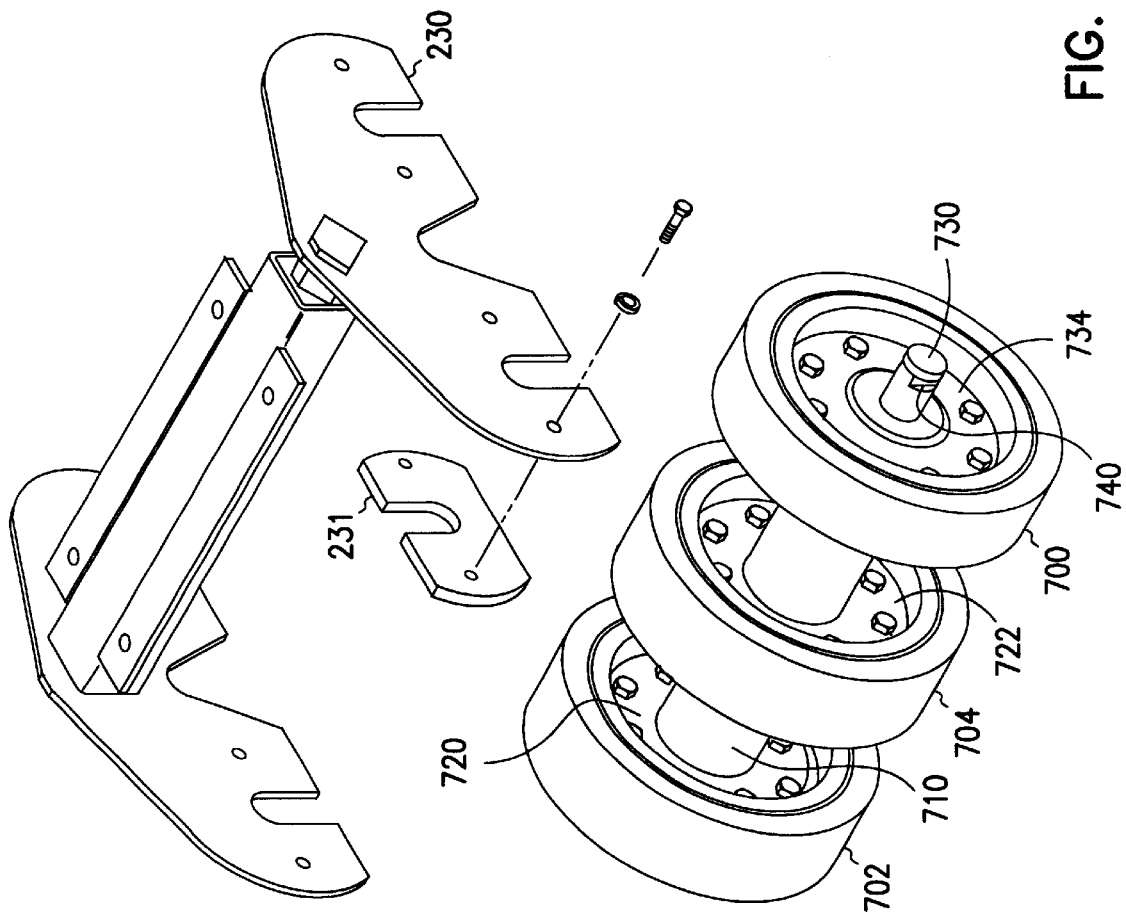
FIG. 8 is a perspective view of an axle 710 and the wheel plate.

FIG. 7 is an exploded perspective view showing multiple flanges 720, 721, 722, and 724 rotatably attached to a single tubular axle 710. FIG. 8 shows an assembled axle and attached wheels. Now turning to FIGS. 7 and 8, the idler wheels or rollers 700 are attached to a the flanges 720, 721, 722 and 724. There are two types of rollers or idler wheels 700. The first type of roller or idler wheel 700 is an outside wheel 702 which fits one of the ends of the axle 710. The second type of roller or idler wheel 700 is an intermediate wheel 704. The intermediate wheel 704 attaches to flanges 721 and 722 intermediate the two ends of the axle 710. The intermediate wheel 704 comprises a first half 706 and a second half 708. Each of the two halves 706 and 708 is split along a diameter of the wheel 704 to form two semicircular halves. The two semicircular halves 706 and 708 are bolted to the flange 722 on the axle 710 to form an intermediate wheel 704. The outside wheels 702 and the intermediate wheel 704 form a circular plastic rim with a rubber outer diameter. The plastic rims are bolted to the flanges 720, 721, 722, and 724. The outside wheels are provided with an endcap 732 and an endcap 734.

The axle 710 is a hollow tubular element. The flanges 720, 722, and 724 are attached to the hollow tubular element. The axle 710 or hollow tubular element is mounted on a shaft 730. The shaft 730 has two ends which protrude from the ends of the hollow tubular axle 710. The tubular axle 710 is rotatably attached to the shaft 730 by a first roller bearing set 750 and a second roller bearing set 752. The entire inner portion of the axle is filled with oil or grease. The roller bearings 750 and 752 are both sealed bearings. The roller bearings 750 and 752 are provided with multiple seals so that a sealed bearing for all three wheels 700 (shown in FIG. 8) is formed. Use of a sealed bearing sharply reduces maintenance time and keeps the life of the bearings high. Including three rollers or idler wheels 700 on an axle 710 is less expensive to manufacture and also provides for a maintenance free part that lasts up to the life of the vehicle 100. Each end is provided with three seals. The bearing has a first seal 760, an annular plastic or rubber element that fits over one side of the bearings, which comes with the bearing set. A second seal 762 is positioned outside of the bearing set. A third seal 764 includes seven different seals in one. The third seal 764 has a tortuous path to prevent dirt from getting into the bearing or into the space between the axle 710 and the shaft 730. If dirt or other contaminants get into the grease or the oil covering the bearing sets 750 and 752, the life of the bearings will be shortened. However, dirt entering through the first seal 760, the second seal 762 and the third seal 764 would have to pass through nine seals in order to get to the lubricant. The rollers in each of the bearing sets are in a cage. The roller cage and the bearings are submersed in the oil or grease found within the hollow tubular axle 710.

FIG. 8 shows the wheels 700 attached to the tubular axle 710. The single shaft 730 is shown protruding from the sealed end of the tubular axle 710. The shaft 730 extends beyond the endcap 734. The shaft 730 includes a flat or keyway 740 that engages the wheel plate 230. The wheel plate 230 includes an axle capture plate 231 which, when bolted to the wheel plate 230, captures the axle 730. Only one axle capture plate is shown in FIG. 8.

FIG. 9 is a perspective view of the drive mechanism including the sprocket 900 which engages the drive lugs 322 on the track 300. A first scraper 940 and a second scraper 942 are positioned near the inner diameter of the drive sprocket to clear the drive sprocket of debris that may otherwise accumulate. The driver sprocket 900 includes a central drive plate 902. A number of tubular elements 904 are welded or otherwise attached to the central drive plate 902. Attached to the central drive plate is a first annular unit 910 and a second annular unit 911. As shown, the first annular unit 910 and a second annular unit 911 are attached to the central drive plate 902 using a long bolt or pin 912. A set of spacers 914 and 916 are used to define the spatial relationships between the central drive plate 902 and the first annular unit 910 and the second annular unit 911. Spacers 914 and 916 also carry roller sleeves 920 and 922. The roller sleeves roll with respect to the spacers and with respect to the central drive plate 902. In other words, the roller sleeves 920 and 922 fit between the drive plater 902 and the first annular unit 910, and between the drive plater 902 and the second annular unit 911. The roller sleeves 920 and 922 are dimensioned and spaced so that they can engage the spaces between the drive lugs 322 on the inside portion 320 of the rubber or elastomeric track 300. The roller sleeves are advantageous in that they are self adjusting. As the rubber track passes over a roller sleeve 920 and 922, the pitch of the track 300 actually changes since the track is elastomeric. The roller sleeves accommodate such changes in pitch since they can roll between the drive lugs 322 rather than scrub the inner surface 320 between the drive lugs 322. The end result is that the roller sleeves 920 and 922 also prevent chatter or extra vibrations at various speeds of the track.

The drive plate 902 is attached to a sprocket driver 930. The sprocket driver 930 is attached to portion of the frame of the vehicle and which includes a first scraper 940. Also attached to the sprocket driver 930 is a hydraulic pump 932. The hydraulic pump is attached to a source of hydraulic fluid. As hydraulic fluid is passed through the hydraulic pump 932 an output shaft 934 turns a planetary transmission system housed within the sprocket driver 930. The central drive plate 902 is attached to an annular ridge 909 on the sprocket driver 930. A second scraper 942 is attached a plate 907 which is attached to the undercarriage frame 210. The sprocket driver 930 is attached to the plate 907. There are a series seals and a cap 905 that prevents contamination of the sprocket driver 930 with dirt or other contaminants.

The scrapers 940 and 942 force and remove the debris from the drive sprocket 900 and deposit it outside the drive sprocket 900. This is critical since build up of debris within the sprocket will generally tend to change the pitch line of the track further. In addition, debris build up tends to act to dislodge or derail the track 300 from the drive sprocket 900. The first scraper 940 and the second scraper 942 are cantilevered in toward the central drive plate 902 of the drive sprocket 900. The second scraper 942 is cantilevered from another plate 907 that is typically attached to the undercarriage frame 210. The first scraper 940 and the second scraper 942 are positioned near the inner diameter of the rollers 920 and 922 of the driver sprocket 900. The scrapers 940 and 942 remove debris from the rollers and force the debris away from the sprocket driver 930 and the track 310. The scrapers 940 and 942 are cantilevered and stick into the inside diameter of the driver sprocket 900. Without the scrapers 940 and 942, mud and other debris would accumulate and eventually lift the track 300 from the drive sprocket 900 to dislodge it from its operating position. The scrapers 940 and 942 are arcuate in shape. By dislodging mud and other debris from the driver sprocket 900 and placing the debris elsewhere, the scrapers 940 and 942 keep the driver sprocket 900 clean and clear of mud or other debris.

The placement of the driver sprocket 900 enhances the ability of the track to stay on or not become dislodged, when compared to other vehicles. Now referring FIGS. 1, 2 and 9, the driver sprocket 900 is placed off the ground or surface 110, and toward the rear of the vehicle. Placing the driver sprocket above the ground prevents derailing for several reasons. The force of the driver sprocket 900 on the track tends to act to dislodge the track 300 from the driver sprocket 900. When the driver is on the ground, not only is the driver sprocket driving the track 300, it is also trying to maintain the alignment of the track. Thus, when the driver sprocket 900 is on the ground the two jobs counteract one another. In other words, the track is undergoing a force tending to dislodge or derail the track 300 while also being used to keep the track 300 aligned. Placing the driver sprocket 900 above the ground removes the function of maintaining alignment. The above ground driver sprocket's only function is to drive the track 300. In addition, placing the driver sprocket 900 above ground and near the rear of the vehicle prevents dislodgment of the track 300. In the elevated position, the driver sprocket applies a large force to the track at the last or rear axle carrying three roller or idler wheels 700. The drive sprocket 900 pulls the track 300 into alignment with the wheels associated with the rear axle thereby keeping the track from being dislodged or coming off the rollers. It should be noted that dislodgement or track derailing is very costly and time consuming. Many times the track 300 is ruined or damaged due as a result of being dislodged.

Figure 10:
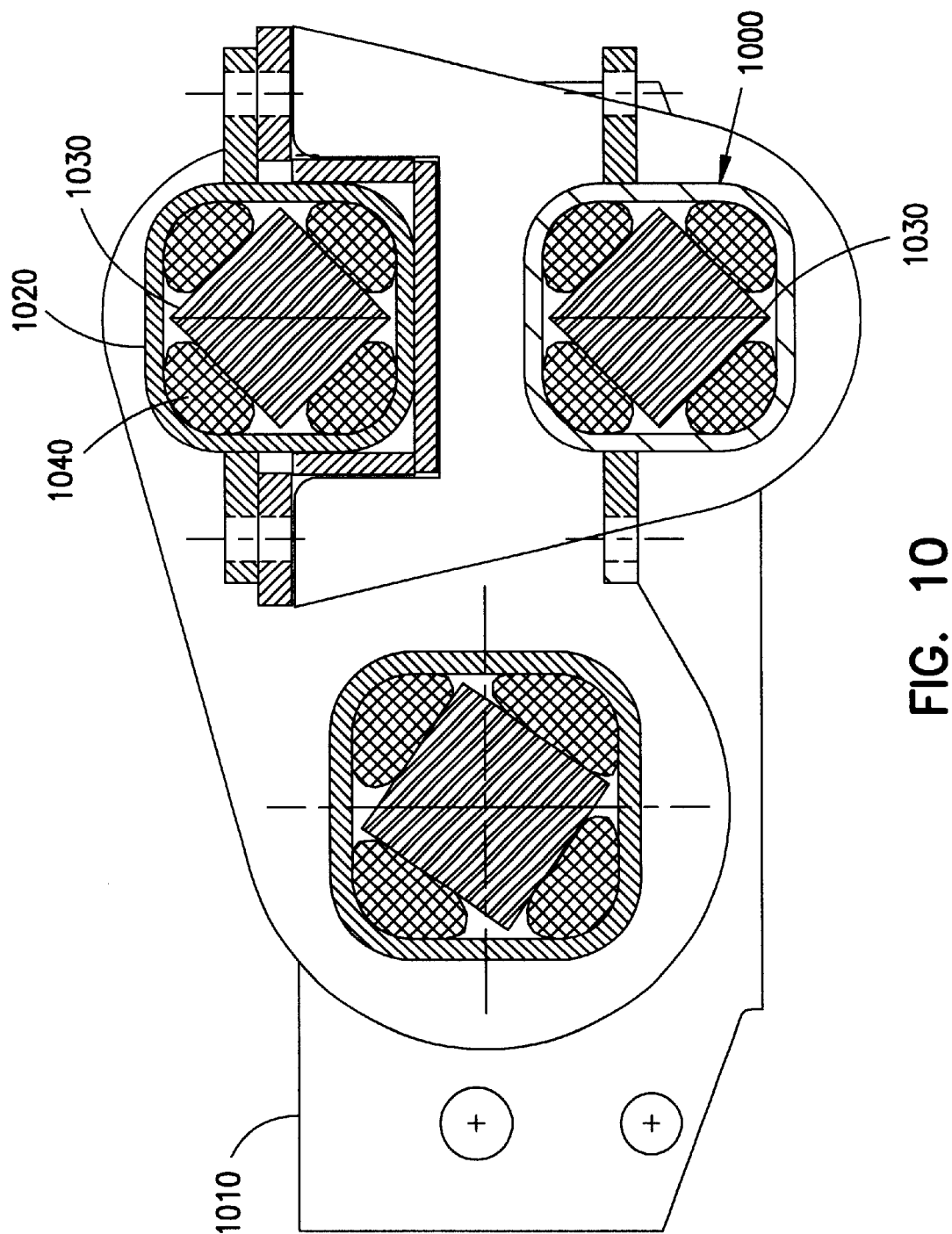
FIG. 10 is a cross-sectional view showing the suspension unit, also called the rear torsion axle and swing joint.

FIG. 10 is a cross-sectional view showing the axle mounting bracket 1010 which uses a several suspension units also called a torsion axle 1000. Each torsion axle 1000 is comprised of a shell 1020 of a length of square tubular material. An inner bar 1030 having a substantially square cross section is positioned within the shell 1020. Rubber cords 1040 are placed between the shell 1020 and the inner bar 1030. The inner bar is placed on a diagonal with respect to the inside square cross section of the tubular material comprising the shell 1020. Within the square tubular stock of the shell 1020, there is fitted a square cross-sectional piece of rectangular stock referred to as the inner bar 1030. The inner bar 1030 has a diagonal which is slightly less than the shortest dimension between the walls of the square tubular stock of the shell 1030. The inner bar 1030 makes a diamond inside or is fitted within the square tubular stock so that it looks like a diamond within the perimeter of the square tubular stock shell 1020. Positioned in the corners of the square tubular stock of the shell 1020 are four elastomeric cords or rubber cords 1040 which run the entire length of the shell 1020.

This arrangement provides for a stiff suspension unit or torsion axle that never requires lubrication and is therefore maintenance free and very reliable. The torsion axles 1000 are used throughout the undercarriage 200. Turning briefly to FIG. 2, the x's shown in that figure depict attachments which use the torsion axle 1000. For example, two wheel plates 230 and 232 carry two axles 710 and 712. Each of the axles 710 and 712 have three wheels attached thereto. The wheel plates are attached to one another via a torsion axle 1000. The torsion axle 1000 is a stiff suspension member used to attach two axles of three wheels a piece to the undercarriage frame 210. The end result is an inexpensive, simple, and straightforward suspension member that is impervious to dirt, requires little or no maintenance, and which does not need to be sealed.

Figure 11:
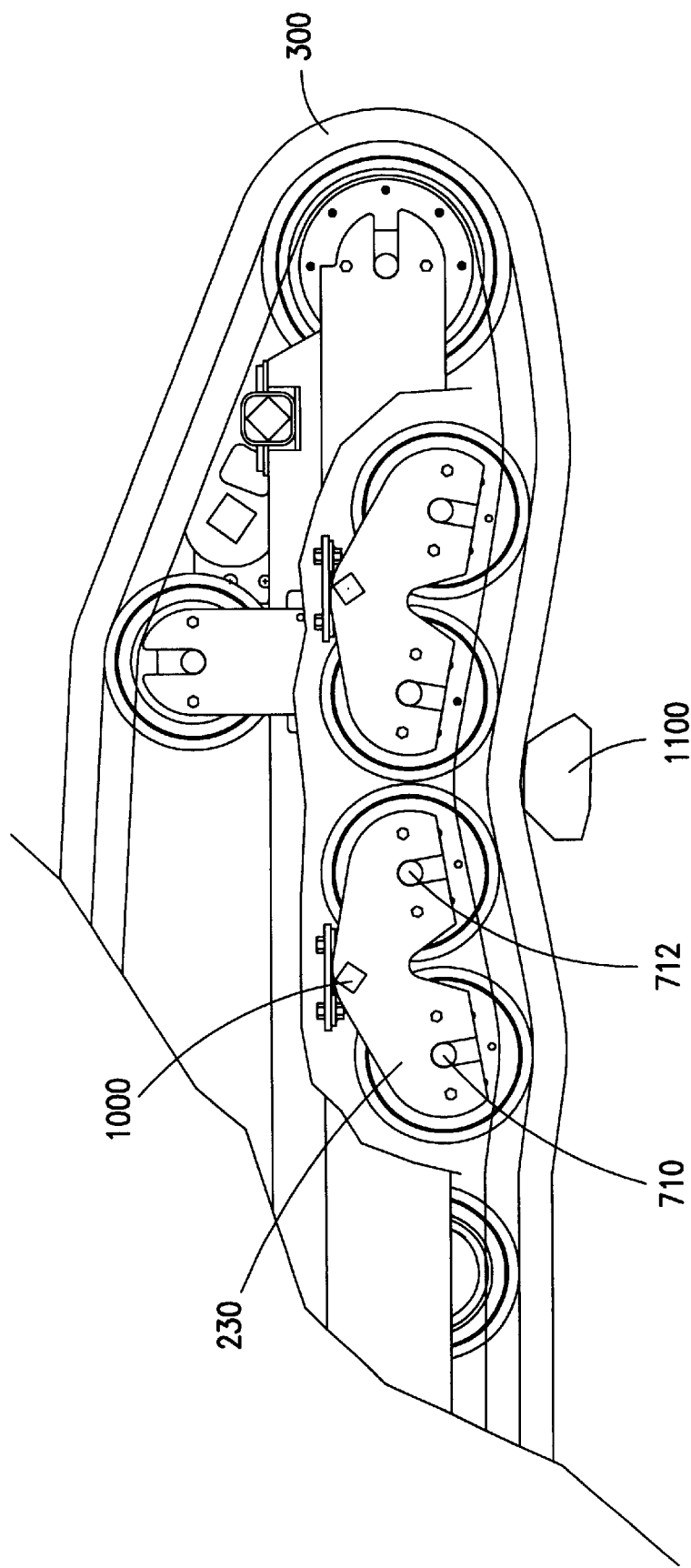
FIG. 11 is a partial perspective view of the undercarriage of the multi-surface vehicle as it engages an obstacle on the surface being traversed.

FIG. 11 is a partial perspective view of the undercarriage 200 of the multi-surface vehicle 100 as it engages an obstacle 1100 on the surface 110 being traversed. The resulting amount of stiffness produced by the torsion axles 1000 allows the wheels to hug the ground 110 even when a rock or other obstacle 1100 is encountered so as to keep more tread 312 of the track 300 on the ground 110 at any given time. When an obstruction is not encountered, the torsion axle 1100 is sufficiently stiff so that the belt or rubber track maintains a substantially unbowed state between the wheels 700 associated with the undercarriage 200.

Advantageously, the vehicle will travel over soft surfaces without causing damage to the surface. In addition, unlike other vehicles, the vehicle sinks little in soft mud or snow. The resulting vehicle is very effective in transmitting power to the surface over which it passes. The vehicle requires very low maintenance since the bearings associated with the undercarriage are sealed. Other suspension units are simple and straightforward and require little or no maintenance. The vehicle also is less prone to track derailment.

Although specific embodiments have been illustrated and described herein, it is appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and the equivalents thereof.

What is claimed is:

1. A vehicle for traversing a surface comprising:
    a frame and an undercarriage a first suspension mount attaching the undercarriage to the frame;
    a first end axle and a second end axle fixedly attached to the undercarriage,
    a flat track further comprising:
        an inner surface, said inner surface including a plurality of driving lugs; and
        an outer surface having a pattern for gripping;
    a driver sprocket for said track, said driver sprocket fixed with respect to the undercarriage, said driver sprocket engaging at least some of said plurality of driving lugs;
    said driver sprocket, said first end axle, and said second end axle fixed with respect to each other;
    a plurality of wheels in contact with the inner surface of the track as the track engages the surface;
    additional suspension mounts attaching at least some of the plurality of wheels to the undercarriage, wherein at least some of said wheels are not fixed with respect to said first end axle, said second end axle, and said driver sprocket
    at least some of said plurality of wheels attached to said first axle and at least some of said plurality of wheels attached said second axle;
    wherein said flat track is held in substantially constant tension about said driver sprocket and said plurality of wheels; and,
    wherein the driver sprocket is located remote from the portion of the track in contact with the surface traversed by the vehicle.

2. The vehicle of claim 1 wherein the driving lugs on the inner surface of the track are aligned, and said plurality of wheels are aligned so that the driving lugs pass between the wheels in contact with the inner surface of the flat track.

3. The vehicle of claim 1 wherein the plurality of wheels are mounted on axles.

4. The vehicle of claim 3 wherein each axle includes at least two wheels.

5. The vehicle of claim 1 wherein the driving lugs are formed into two aligned rows on the inner surface of the track, and said plurality of wheels are aligned so that the driving lugs pass between the wheels in contact with the inner surface of the flat track.

6. The vehicle of claim 5 wherein each axle includes at least three wheels, said axle including a sealed bearing.

7. The vehicle of claim 1 wherein the flat track includes rubber.

8. The vehicle of claim 7 wherein the flat track further comprises layers of flexible strengthening material incorporated with the rubber.

9. The vehicle of claim 7 wherein the flat track further comprises fiberglass rods encased by flexible strengthening material incorporated with the rubber.

10. The vehicle of claim 1 wherein the flat track has beveled edges.

11. The vehicle of claim 1 wherein the pattern for gripping associated with outer surface of the track comprises:
    a first rib crossing at least a portion of the outer surface of the track; and
    a second rib crossing at least a portion of the outer surface of the track, said first rib and said second rib spaced so that the first rib moves toward the second rib to grip the surface the vehicle is traversing, said first rib moving toward the second rib after the track passes over the wheels attached to the end axle.

12. The vehicle of claim 1 wherein the vehicle has a front and a rear, the driver sprocket for driving the track is located toward the rear of the vehicle.

13. The vehicle of claim 1 wherein the driver sprocket further includes a plurality of rotatable sleeves for driving the driving lugs associated with the track.

14. The vehicle of claim 1 wherein the driver sprocket is substantially cylindrical in shape and has a substantially curved inner portion, said vehicle further comprising a scraper positioned near the substantially curved inner portion of the driver sprocket to remove debris from the driver sprocket.

15. The vehicle of claim 1 wherein the suspension mounts comprise torsion axle suspension units.

16. The vehicle of claim 15 wherein the torsion axle suspension units comprise:
    a first solid axle portion;
    a second tubular portion, the first solid axle portion fitting within the second tubular portion; and
    an elastomeric portion fitting within the spaces between the first solid axle and the second tubular portion.

17. A vehicle for traversing a surface comprising:
    a frame and an undercarriage, a first suspension mount attaching the undercarriage to the frame;
    a first end axle and a second end axle fixedly attached to the undercarriage,
    a flat track having an inner surface and an outer surface, said inner surface including a plurality of driving lugs and said outer surface having a pattern for gripping;
    a drive mechanism for said track, said drive mechanism engaging at least some of said plurality of driving lugs, said drive mechanism further comprising:
        a sprocket driver having a transmission therein;
        a driver sprocket having a central drive plate, the central drive plate attached to said sprocket driver;
        a plurality of spacers attached between the central drive plate and a first annular unit and between the central drive plate and a second annular unit;
    said driver sprocket fixed in relation to said undercarriage;
    said driver sprocket, said first end axle, and said second end axle fixed with respect to each other;
    a plurality of wheels in contact with the inner surface of the track as the track engages the surface;
    additional suspension mounts attaching at least some of the plurality of wheels to the undercarriage, wherein at least some of said wheels are not fixed with respect to said first end axle, said second end axle and said sprocket driver;
    at least some of said plurality of wheels attached to said first axle and at least some of said plurality of wheels attached said second axle; and,
    wherein said flat track is held in substantially constant tension about said sprocket driver and said plurality of wheels; and,
    wherein the driver sprocket is located remote from the portion of the track in contact with the surface traversed by the vehicle.

18. The vehicle of claim 17 wherein the sprocket driver is located more than one foot above the ground.

19. The vehicle of claim 17 wherein a plurality of pins are used to attach the first annular unit and the second annular unit to the central drive plate.

20. The vehicle of claim 19 wherein the sprocket driver further comprises rotatable sleeves positioned over the spacers between the first annular unit and the central drive plate, and over the spacers between the second annular unit and the central drive plate.

21. The vehicle of claim 17 wherein the drive mechanism further comprises:
   a first scraper extending into the space between the sprocket driver and the first annular unit; and
   a second scraper extending into the space between the sprocket driver and the second annular unit.

22. A vehicle for traversing a surface comprising:
   a frame and an undercarriage, a first suspension mount attaching the undercarriage to the frame;
   a first end axle and a second end axle fixed attached to the undercarriage;
   a flat track having an inner surface and an outer surface, said inner surface including a plurality of driving lugs and said outer surface having a pattern for gripping;
   a driver sprocket for said track, said driver sprocket engaging at least some of said plurality of driving lugs;
   said driver sprocket, said first end axle, and said second end axle fixed with respect to each other;
   a plurality of wheels in contact with the inner surface of the track as the track engages the surface;
   at least some of said plurality of wheels attached to said first axle and at least some of said plurality of wheels attached to said second axle;
   additional suspension mounts attaching at least some of the plurality of wheels to the undercarriage, wherein at least some of said wheels are not fixed with respect to said first end axle, said second end axle, and said driver sprocket;
   wherein said flat track is held in substantially constant tension about said driver sprocket and said plurality of wheels;
   wherein the driver sprocket is located remote from the portion of the track in contact with the surface traversed by the vehicle, and,
   said first suspension mount and said additional suspension comprising:
      tubular stock having a substantially square cross section; and
      a bar having substantially square cross section, the length of the diagonal on the bar being less than the distance across the inside tubular stock so that the bar may be positioned within the tubular stock; and
      elastomeric elements positioned between the bar and the tubular stock.

23. The vehicle of claim 22 wherein the elastomeric elements of the suspension mount are rubber cording.

24. The vehicle of claim 22 wherein the elastomeric elements of the suspension mount are rubber cording, said rubber cording positioned in the corner areas of the substantially square stock.

25. A vehicle for traversing a surface comprising:
   a frame and an undercarriage, a first suspension mount attaching the undercarriage to the frame;
   a first end axle and a second end axle fixedly attached to the undercarriage,
   a flat track having an inner surface and an outer surface, said inner surface including a plurality of driving lugs and said outer surface having a pattern for gripping;
   a driver sprocket for said track, said driver sprocket engaging at least some of said plurality of driving lugs;
   said driver sprocket, said first end axle, and said second end axle fixed with respect to each other;
   a plurality of wheels in contact with the inner surface of the track as the track engages the surface;
   additional suspension mounts attaching at least some of the plurality of wheels to the undercarriage, wherein at least some of said wheels are not fixed with respect to said first end axle, said second end axle, and said driver sprocket;
   at least some of said plurality of wheels attached to said first axle and at least some of said plurality of wheels attached said second axle;
   wherein said flat track is held in substantially constant tension about said driver sprocket and said plurality of wheels;
   wherein the driver sprocket is located remote from the portion of the track in contact with the surface traversed by the vehicle, and,
   said plurality of wheels include sets of wheels, wherein a set of wheels further comprises:
      a shaft;
      an axle having wheels attached thereto, said axle having an opening therein having a diameter greater than the shaft; and
      a bearing for rotatably attaching the axle to the shaft.

26. The vehicle of claim 25 wherein the axle of the set of wheels further comprises a flange attached to the outside of the axle, at least one wheel attached to said flange.

27. The vehicle of claim 25 wherein the bearing of the set of wheels is sealed.

28. The vehicle of claim 27 wherein the axle of the set of wheels is sealed.

29. A vehicle for traversing a surface comprising:
   a frame and an undercarriage, a first suspension mount attaching the undercarriage to the frame;
   a first end axle and a second end axle fixedly attached to the undercarriage,
   a flat track having an inner surface and an outer surface, said inner surface including a plurality of driving lugs and said outer surface having a pattern for gripping;
   a driver sprocket for said track, said driver sprocket engaging at least some of said plurality of driving lugs;
   said driver sprocket, said first end axle, and said second end axle fixed with respect to each other;
   a plurality of wheels in contact with the inner surface of the track as the track engages the surface;
   additional suspension mounts attaching at least some of the plurality of wheels to the undercarriage, wherein at least some of said wheels are not fixed with respect to said first end axle, said second end axle, and said driver sprocket;
   at least some of said plurality of wheels attached to said first axle and at least some of said plurality of wheels attached to said second axle;
   wherein said flat track is held in substantially constant tension about said driver sprocket and said plurality of wheels; and,
   said plurality of wheels include sets of wheels, wherein a set of wheels further comprises:
      a shaft;
      an axle having wheels attached thereto, said axle having an opening therein having a diameter greater than the shaft; and
      a bearing for rotatably attaching the axle to the shaft,
   wherein the axle of the set of wheels further comprises a flange attached to the outside of the axle at least one wheel attached to said flange; and
   wherein the wheel of the set of wheels is attached to the flange is split.

* * * * *